United States Patent Office 3,020,298
Patented Feb. 6, 1962

3,020,298
ALUMINUM ACETYLENIC COMPOUNDS
Eugene C. Ashby, Walter E. Foster, Jesse R. Mangham, and Tillmon H. Pearson, all of Baton Rouge, La., assignors to Ethyl Corporation, New York, N.Y., a corporation of Delaware
No Drawing. Filed Apr. 10, 1957, Ser. No. 651,796
8 Claims. (Cl. 260—448)

This invention is concerned with novel metal acetylenic compounds and processes for their manufacture. It is particularly concerned with the novel acetylenic aluminum compounds.

Acetylenic compounds of particular metals have long been known, for example, the alkali metal acetylides have been prepared and found to be of particular usage. Likewise the alkaline earth acetylides and those of magnesium are generally well known. These acetylides are highly reactive and for this reason difficult to handle.

Metal acetylenic compounds of the true metals of group III–A of the periodic system have not been prepared, nor are any methods known which suggest their preparation. The best known and most useful compounds of the group III–A metals are the alkyl aluminum compounds, such as, triethylaluminum. These compounds are quite useful but are highly reactive with the atmosphere requiring their use under controlled conditions. It has been discovered that acetylenic compounds of the true metals of group III–A of the periodic table can be prepared which exhibit physical and chemical properties distinct from the prior art metal acetylides and from the known organo metallic compounds of the group III–A metals.

An object of this invention is to provide novel organometallic compounds of the true group III–A metals. A particular object is to provide new and useful acetylenic compounds of these metals. An additional object is to provide novel processes for the manufacture of such acetylenic compounds. A more specific object is the provision of novel acetylenic aluminum compounds and processes for their manufacture. These and other objects will be evident as the discussion proceeds.

According to this invention novel compositions of matter are provided which comprise a group III–A metal compound having at least one acetylenic radical bonded to the metal wherein the triple bond is in the alpha position. The metal can also have attached thereto organic radicals, hydrogen, a cation of organic or inorganic acid, or a second metal. The novel products can be depicted by the following structural formula:

(I)
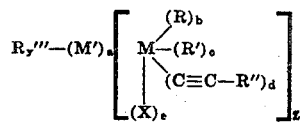

wherein M is a true metal of group III–A of the periodic table of the elements, M' is an element from the groups I–A and B, II–A, and II–B, and III–A; R, R' and R" can be the same or different and are selected from the group consisting of hydrogen and monovalent organic radicals; X is a cation of an organic or inorganic acid; R'" can be R, R', —C≡C—R", or X; and the subscripts are small whole numbers as follows: "a" is 0 to 3, "b" is 0 to 5, "c" is 0 to 5, "d" is 1 to 6, "e" is 0 to 5, "y" is 0 to 2, and "z" is 1 to 3 depending on the valence of M'. In a particularly preferred embodiment the group III–A metal M is aluminum because of the greater availability of this material and its economy.

As stated hereinbefore, the groups R, R' and R" can be hydrogen or a monovalent organic radical. Although any monovalent organic radical can be employed the monovalent hydrocarbon radicals are especially preferred because of the advantageous characteristics of the products thereby defined. The term monovalent hydrocarbon radical denotes a univalent aliphatic, alicyclic, or aromatic radical which can be further substituted. By the term univalent aliphatic radical is intended a univalent radical derived from an open chain saturated or unsaturated carbon compound. The term univalent alicyclic radical denotes a univalent radical derived from the corresponding aliphatic compounds by ring formation.

Thus, when the substituents of the compounds of this invention are univalent aliphatic radicals, they can be radicals such as the alkyl radicals, methyl, n-propyl, isopropyl, n-butyl, tertiary butyl, n-amyl, and various positional isomers such as, for example, 1-methylbutyl; 2-methylbutyl; 1,1-dimethylpropyl; 1,2-dimethylpropyl; and 1-ethylpropyl, and likewise, the corresponding straight or branched chain isomers of hexyl, heptyl, and the like up to and including about eicosyl. Moreover, such monovalent aliphatic radicals can be alkenyl radicals such as, for example, vinyl, 1-propenyl, 2-propenyl, 1-butenyl, 3-butenyl, and the corresponding branched chain isomers thereof, and other alkenyl radicals such as hexenyl, heptenyl, up to and including eicosenyl, and their corresponding branched chain isomers. Further such monovalent hydrocarbon sustituents can be aralkyl radicals such as, for example, benzyl, 1-phenylethyl, 2-phenylethyl, 1-phenylpropyl, 3-phenylpropyl, 2-phenylisopropyl, 1-phenylbutyl, 3-phenylbutyl, and the like, and α-naphthylmethyl, and the like, and their corresponding positional isomers. Moreover, the univalent aliphatic radical or radicals can be aralkenyl radicals such as, for example, 1-phenyl-2-propenyl, 3-phenyl-2-propenyl, 1-phenylisopropenyl, and similarly, the phenyl derivatives of the isomers of butenyl, pentenyl, hexenyl, and the like. Other such aryl alkenyls include 1-(α-naphthyl)-ethenyl, 2-(α-naphthyl)- ethenyl, 2-(β-naphthyl)-ethenyl, 2-(β'-naphthyl)-isopropenyl, and the like.

When the monovalent hydrocarbon radical is a univalent alicyclic radical or radicals, these can be selected from the group consisting of cycloalkyl and cycloalkenyl radicals. Thus, for example, they can be the cycloalkyl radicals, cyclopropyl, cyclobutyl, cyclohexyl, cyclooctyl, cyclononyl, cyclodecyl, and the like, and such cycloaliphatic radicals as 1-cyclopropylethyl, 2-cyclopropylethyl, 1-cyclobutylpropyl, 3-cyclobutylpropyl, and the like. Similarly, the alicyclic radicals can be cycloalkenyl radicals such, for example, 1-cyclohexyl ethenyl, 1-cycloheptyl-1-propenyl, 2-cyclooctyl-2-propenyl, and the like. When the monovalent hydrocarbon radical is a univalent aromatic radical or radicals, these can be selected from the group consisting of aryl and alkaryl radicals; for example, aryl radicals such as phenyl, α-naphthyl, β-anthryl, and the like, and alkaryl radicals, such as for example, o-tolyl; p-tolyl; 2,3-xylyl; 2,6-xylyl; 3,5-xylyl; and the like, or o-ethylphenyl, p-ethylphenyl, β-methyl-α-naphthyl, and the like.

The preferred monovalent hydrocarbon radicals are those containing between about 1 to 10 carbon atoms, especially the alkyl radicals. In general, however, monovalent hydrocarbon radicals having up to about 20 carbon atoms are included. It is not intended that the groups R, R' and R" shall be restricted to the examples cited herein, as additional examples will be evident to those skilled in the art.

As set forth above, the constituent "X" can be any cation of an organic or inorganic acid. It has been found that the halides form particularly advantageous constituents of the novel compounds because of their economy and greater reactivity. In general any halide is included, e.g. chlorine, bromine, fluorine or iodine, although chlorine and iodine are particularly preferred.

The metal M is a true metal of group III–A of the periodic system, namely, aluminum, gallium, indium and thallium. The compounds in which aluminum is the metal M are especially preferred because of their low cost, ease of formation and advantageous chemical and physical characteristics. The metal M' includes, for example, sodium, potassium, lithium, copper, silver, calcium, barium, strontium, zinc, mercury and the aforementioned group III–A metals. It is preferred that the constituent M' be a group I–A metal especially sodium, potassium, or lithium since the products thereby described are of greater reactivity but still highly stable.

Typical but non-limiting examples of the novel compounds of this invention as described hereinbefore include triethynyl aluminum, 1-trihexynyl aluminum, diethyl ethynyl aluminum, ethynyl aluminum dichloride, 1-hexynyl diphenyl aluminum, ethyl-1-hexynyl aluminum hydride, ethyl-1-dihexynyl aluminum, sodium triethyl-1-hexynyl aluminum, sodium diethyl ethynyl aluminum chloride, mercuric aluminum tetrahexynyl, and the like.

In general, the novel products of this invention are prepared by the reaction of a chemical having the general formula (II)

wherein M, R, R', and X have the meaning hereinbefore set forth and the subscripts "$b$," "$c$" and "$e$" are small whole numbers from 0 to 3 with a compound having the structure (III) $\quad A-(C\equiv C-R'')_f$ wherein R'' has the meaning hereinbefore defined; A is a metal, M', as described previously, a halogen, or hydrogen; and the subscript "$f$" is a smal whole number from 1 to 3 depending upon the valence of A.

As will be readily evident, typical examples of the chemical II include aluminum, aluminum trichloride, diethylaluminum chloride, ethylaluminumdichloride, aluminumdichloride hydride, triphenylaluminum, trischlorohexylaluminum, diethylaluminum hydride, and the like and corresponding compounds of the metals gallium, indium and thallium. Typical but non-limiting examples of the reactant III include ethyne, propyne, chloroethyne, ethynyl sodium, 1-hexyne, ethynyl benzene, diethynyl calcium, diethynyl magnesium, diethynyl mercury, di-1-hexynyl mercury, 1-hexynyl lithium, ethynyl potassium, di(1-butynyl) zinc, 1-bromo-1-hexyne, 1-chloro-2-phenylethyne, and the like acetylenic compounds which have their acetylenic linkage at the alpha position.

In general the conditions under which the aforementioned materials are reacted are not critical and can be varied over a wide range. For example, an excess of either reactant II or III can be employed. Likewise, temperatures between about room temperature and the decomposition temperature of the products or reactants are suitable and pressure can be varied from subatmospheric to super-atmospheric. Organic diluents can be employed, if desired, provided they are essentially inert. Generally the temperature which is preferably employed is between about 25° to 75° C. and atmospheric pressure is usually employed and preferred.

Although the above discussion of methods of preparing the novel compounds has been in general terms, it is not intended that all embodiments are equivalent. Under certain conditions and/or with certain reactants, particular advantage can be achieved. By way of illustration, some advantage in the proportions employed is obtained when particular reactants are used. For example, when reacting a group III–A fully alkylated metal compound, as aluminum triethyl, with an acetylenic hydrocarbon, e.g. 1-hexyne the proportions are generally such that 0.5 to 1.5 moles of the acetylenic compound per mole of the organometallic compound are employed. In order to produce even higher yields and to avoid the formation of polymer, which makes the route less desirable, these constituents are preferably reacted in essentially equimolar quantities. Similar proportions are employed when reacting an alkyl metal halide with a metal acetylide of the I–A metals, e.g. the reaction of diethylaluminum chloride with 1-hexynyl sodium. On the other hand when reacting a group III–A metal per se, e.g. aluminum, with an acetylenic compound of Formula III wherein A is hydrogen or a halogen, it is preferred to employ between 1.5 and 3 moles of the Compound III per mole of the metal. Likewise, when reacting metal acetylenic compounds of the polyvalent metals, e.g. di-1-hexynyl mercury with the group III metal per se, e.g. aluminum, it is preferred to employ between about 1 to 5 moles of the group III–A metal per mole of the metal acetylenic compound.

Among the organic diluents which can be employed are included the hydrocarbons, ethers, amines and organic halides. Some of such organic media will complex with certain of the reactants, e.g. the ethers complex with organoaluminum compounds, but are not deleterious to the principal reaction and are useful in this form.

The novel products of this invention and the processes for their manufacture will be more completely understood by reference to the following examples, wherein all parts are by weight.

*Example I*

In a reactor equipped with internal agitation, external heating means and a means for introducing and discharging materials is added 300 parts of toluene and 75 parts of diethynylmercury. To this reactor is added 10 parts of finely divided aluminum prepared by grinding an aluminum rod under hexane. Agitation is commenced and the reactor heated to 50° C. These conditions are maintained for a period of 2 hours. At the end of this period the reaction mixture is filtered to remove solids, stripped of solvent, and, upon analysis, a high yield of mercuric aluminum tetraethynyl is found, $Hg(Al(C\equiv CH)_4)_2$. Then 400 parts of diethylether and 5 parts of divided aluminum is added to the above product and the reaction continued for one hour at 35° C. At the end of this time excess aluminum along with the mercury by-product which is formed is separated and a high yield of aluminum triethynyl is obtained.

It is not necessary to perform the above operation step-wise as indicated. The following example will demonstrate the formation of a triacetylenic aluminum compound in a one-step operation.

*Example II*

Employing a reactor similar to that above 5.5 parts of aluminum, prepared by grinding an aluminum rod under hexane and replacing the hexane with 35 parts of diethyl ether, was placed therein. Then 11 parts of di-1-hexynyl mercury were added to the reactor. Thus a 900 percent excess of aluminum was used. An immediate exothermic reaction took place causing vigorous refluxing of the ether solvent. The reaction temperature was held at 35° C. for one hour longer. Then the aluminum and insoluble mercury by-product were filtered off leaving a colorless solution. This solution was then distilled removing the ether and leaving tri-1-hexynylaluminum as a residue. This product was analyzed and found to contain aluminum and 1-hexynyl groups in the stoichiometric proportions required by the formula $Al(C\equiv C-C_4H_9)_3$.

*Example III*

Employing a reactor similar to that of Example I, 0.26 mole of triethylaluminum was reacted with 0.25 mole of 1-hexyne at 23° to 50° C. for one hour and at atmospheric pressure. A 36 percent theoretical yield of ethane was evolved and an infra red spectrogram was obtained showing the presence of diethyl-1-hexynylaluminum. This product is a colorless liquid.

Example IV

Example III was repeated essentially as described with the exception that 0.25 mole of ethynylbenzene replaced the 1-hexyne employed. No diluents were used and the reaction was continued for 10 hours while increasing the temperature from 26° to 29° C. A 47 percent yield of ethane was evolved and by infra red analysis the formation of diethyl-2-phenyl ethynyl aluminum was verified.

Example V

A solution of 18.1 parts (0.15 mole) of diethylaluminum chloride in 80 parts of isooctane was reacted with 15.6 parts (0.15 mole) of sodium-1-hexynyl spontaneously at room temperature for one hour. At the end of this period the isooctane was stripped from the reaction mixture by vacuum distillation and the semi-solid which remained, sodium diethyl-1-hexynyl aluminum chloride, was distilled at 89° to 114° C. at 0.15 mm. of mercury. A fraction boiling between 110° to 114° C. at 0.15 mm. pressure (13.2 parts) was recovered representing a yield of 53 percent. This liquid was mobile and light yellow in color. Analysis indicated 15.4 percent aluminum, 36.9 percent ethyl groups and 41.3 percent hexynyl groups whereas diethyl-1-hexynylaluminum contains 16.3 percent aluminum, 35.0 percent ethyl groups and 48.8 percent 1-hexynyl groups by calculation.

Example VI

The procedure of Example V was repeated with the exception that aluminum chloride was employed in place of diethylaluminum chloride. Hexynylaluminumdichloride was obtained in high yield.

Example VII

In this run 0.03 mole of dihexynylmercury were mixed with 0.2 mole of aluminum powder in 30 parts of toluene. The temperature rose to 50° C. over 5 minutes and reaction continued for two hours. An 80 percent yield of mercuric aluminum tetrahexynyl was obtained. Analysis of this product showed 6.75 percent aluminum and 23.5 percent mercury whereas $Hg[Al(C \equiv CC_4H_9)_4]_2$ contains 6.0 percent aluminum and 22.2 percent mercury. This compound is a reddish viscous oil.

Example VIII

Example V was repeated as described with exception that 14.3 parts of triethylaluminum were employed in place of diethylaluminum chloride in combination with 12.5 parts of sodium-1-hexynyl with reaction being conducted at 70° C. in 37.4 parts of Bayol D. A theoretical yield of sodium triethyl-1-hexynyl aluminum was obtained. The product was treated with one molar equivalent of anhydrous HCl. The reaction mixture was stripped at 0.4 mm. of mercury at 50° C. It was then filtered and the filtrate was analyzed by infra red and elemental analysis indicating the presence of sodium diethylhexynylaluminum chloride.

Example IX

Example IV is repeated with the exception that 0.25 mole of tributylgallium is reacted with 0.25 mole of ethynylbenzene at room temperature for three hours. Dibutyl (2-phenyl ethynyl) gallium is obtained.

Example X

Example V is repeated with the exception that 0.5 mole of diphenylaluminum bromide is reacted with 0.5 mole of sodium-1-heptyne at 70° C. for 1½ hours in triethylamine as a reaction medium. A high yield of sodium-1-heptynyldiphenylaluminum bromide as the amine complex is obtained.

Example XI

A high conversion to diethylaluminum vinylacetylide is obtained when reacting one mole of vinylacetylene with one mole of triethylaluminum at room temperature for ten hours employing mixed hexanes as a diluent.

Example XII

When bromoacetylene is reacted with triethylaluminum at −10° C. for one hour in cyclohexane employing the procedure of Example III a high yield of diethylaluminum 2-bromoethynyl is obtained.

Example XIII

In this run 11.0 parts of di-1-propynyl magnesium are reacted with 24.1 parts of diethylaluminum chloride at room temperature under a nitrogen atmosphere for three hours. Diethyl-1-propynyl aluminum is obtained in high yield.

Example XIV

Example II is repeated as described. The product from this reaction is then reacted with 1.14 parts of triethylaluminum in 10 parts of diethyl ether at 35° C. for two hours. The product obtained is monoethyldi-(1-hexynyl) aluminum.

Example XV

The procedure of Example V was repeated essentially as described with exception that 0.45 part of aluminum trichloride was reacted with 0.9 part of 1-hexynyllithium in 7 parts of toluene. In this instance there was an immediate evolution of heat and a heavy tan precipitate was formed. This entire reaction mixture was treated with 25 parts of dimethyl ether of diethylene glycol and the result was that the entire reaction mixture became a homogeneous solution. The compound lithium tri-1-hexynyl aluminum trichloride, $Li_3AlCl_3$ $(C \equiv CC_4H_9)_3$, was thus formed and obtained in solution.

Example XVI

The procedure of Example V was repeated essentially as described with exception that 0.42 part of triethylaluminum was placed in the reactor along with 5 parts of light mineral oil solvent. To this was added one part of 1-hexynyl lithium. There was an immediate formation of a tan precipitate. Upon addition of 20 parts of dimethyl ether of diethylene glycol the entire reaction mixture became a homogeneous solution. The compound lithium triethyl tri-1-hexynyl aluminum, $Li_3Al(C_2H_5)_3$ $(C \equiv CC_4H_9)_3$, was thus obtained in the reaction.

The above examples are presented merely as illustrative examples and this invention is not intended to be limited thereby. Additional examples of reactions of compounds of the type II with compounds of the type III to produce the novel products I will be evident.

As indicated previously, it is not necessary that an organic diluent be employed in the process of this invention, however in certain instances some advantage can be obtained in the handling of the materials and dissipation of heat. When an organic diluent is to be employed the general criteria are that they be liquid under the reaction conditions, essentially inert to the principal reaction, and readily recoverable if desired.

Typical examples of organic diluents which can be employed include the hydrocarbons, ethers, organic halides and amines, generally having a total of up to about 20 carbon atoms therein. Among the hydrocarbons that can be employed are the hexanes, nonanes, octadecanes, benzene, toluene, cyclohexane, tetrahydronaphthalene, diesel oil, gasoline and the like. Among the ethers which can be employed are included for example diethyl ether, di-n-butyl ether, n-amylmethyl ether, dibenzyl ether, methylphenyl ether, the diethyl ether of diethylene glycol, the dimethyl ether of diethylene glycol, furan, tetrahydrofuran, and the like. Among the organic halides which can be employed are included for example, benzylchloride, n-butylbromide, octylbromide, cyclohexyl ethyl bromide, dichloroethylene, ethyliodide and the like. Amines which can be employed include the primary, secondary, and tertiary amines. Typical examples of such amines include amines such as methyl, hexyl, ethyl and the like, amines, isobutyl amine, diethyl amine, dibutyl amine, aniline, pyridine, amyldiphenyl amine, p-isobutyl aniline, diphenyl amine, cyclohexyl amine, triethyl amine, isoquinoline, o-ethyl pyridine, trimethyl amine and the like. The tertiary amines are particularly well suited toward obtaining high yields. The aliphatic and aromatic hydrocarbons comprise a particularly preferred group of diluents to be employed in this process. It has been found that such provide high yields and excellent handling characteristics in the reaction. The above are intended merely as illustrations of the organic diluents to be employed in the process of this invention and other examples will be evident.

The products of this invention are of considerable utility. A particular use is their employment in chain growth reactions of olefins. For example, when the product of Example V is pressurized with ethylene in an autoclave to 50 atmospheres at 25° C. for two hours, diethyl 3-octynyl aluminum is obtained in high yield. This product can then be hydrolyzed to recover the 3-octyne which is well known to the art and can be further reacted with sulfuric acid and mercuric sulfate to produce a mixture of octanone-3 and octanone-4. Another typical example of the use of the products of this invention is the reaction of the product of Example V with an acetylenic compound, e.g. 1-heptyne to produce a polymeric material having the formula

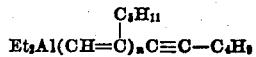

$$Et_2Al(CH=\overset{C_5H_{11}}{\overset{|}{C}})_nC\equiv C-C_5H_{11}$$

When this product is hydrolyzed, the olefinic-acetylenic polymer

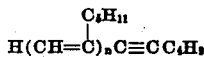

$$H(CH=\overset{C_5H_{11}}{\overset{|}{C}})_nC\equiv CC_5H_{11}$$

is obtained which is an oily amber liquid. This is suitable for use as a drying oil. When other acetylenic compounds of this invention are employed in place of the diethyl 1-hexynyl aluminum, similar useful products are obtained. It has been found that in this particular utility the chain growth reactions occur much more readily and rapidly than the known chain growth reactions with aluminum alkyls, e.g. aluminum triethyl reacting with ethylene.

Having thus described the novel products of this invention and processes for their manufacture, it is not intended that it be limited except as set forth in the appended claims.

We claim:
1. As a new composition of matter an aluminum compound having at least one acetylenic radical bonded to the metal wherein the triple bond is in the alpha position from the aluminum and the remaining valences of the aluminum are satisfied by a group selected from the group consisting of hydrogen, hydrocarbon radicals having up to and including about 20 carbon atoms, and a halogen.
2. As a new composition of matter, aluminum tri-ethynyl.

3. As a new composition of matter, sodium diethyl-1-hexynyl aluminum chloride.
4. A process for the manufacture of the compositions of claim 1 which comprises reacting a compound having the formula

with a compound having the formula $$A—(C\equiv C—R'')_f$$

wherein R, R', and R" are selected from the group consisting of hydrogen and hydrocarbon radicals having up to about 20 carbon atoms; X is a halogen; M is aluminum; "a" is 0 to 3; "b" is 0 to 3; "c" is 0 to 3; the sum of a, b, and c is selected from 0 and 3; A is selected from the group consisting of metals of groups I through III–A, inclusive, halogens, and hydrogen; and "f" is a small whole number from 1 to 3 corresponding to the valence of A.

5. A process for producing sodium diethyl-1-hexynyl aluminum chloride which comprises reacting diethyl aluminum chloride with sodium-1-hexynyl in essentially equimolar amounts.

6. A process for the manufacture of tri-1-hexynyl aluminum which comprises reacting di-1-hexynyl mercury with aluminum.

7. As a new composition of matter a group I–A aluminum compound having at least one acetylenic radical bonded to the aluminum wherein the triple bond is in the alpha position from the aluminum and the remaining valences of the aluminum are satisfied by a group selected from the group consisting of hydrogen, hydrocarbon radicals having up to and including about 20 carbon atoms, and a halogen.

8. A process for the manufacture of a Group I–A aluminum compound which comprises reacting a compound having the formula

with a compound having the formula $$A—C\equiv C—R''$$

wherein R, R', and R" are selected from the group consisting of hydrogen and hydrocarbon radicals having up to and including about 20 carbon atoms; X is a halogen; M is aluminum; "a" is 0 to 3; "b" is 0 to 3; "c" is 0 to 3; the sum of a, b, and c is selected from 0 and 3; and A is a group I–A metal.

References Cited in the file of this patent
UNITED STATES PATENTS

| | | |
|---|---|---|
| 2,082,568 | Carothers et al. | June 1, 1937 |
| 2,082,569 | Carothers et al. | June 1, 1937 |
| 2,356,476 | Shappirio | Aug. 22, 1944 |

OTHER REFERENCES

J. Amer. Chem. Soc., 38 (1916), 1382 to 1384.
J. Amer. Chem. Soc., 39 (1917), 1420 to 1421.
Comptes rendus de l'Aca. des. Sci., 239 (1954), pp. 1303–5.